United States Patent [19]

Frinzel

[11] 4,113,222
[45] Sep. 12, 1978

[54] INTRAVENOUS POLE

[76] Inventor: Jerry C. Frinzel, 3208 Mission Ave., Carmichael, Calif. 95608

[21] Appl. No.: 801,478

[22] Filed: May 31, 1977

[51] Int. Cl.² ........................................... F16M 11/00
[52] U.S. Cl. ..................................... 248/412; 248/125
[58] Field of Search ............... 248/125, 412, 295, 296, 248/311.3

[56] References Cited

U.S. PATENT DOCUMENTS

| 430,392 | 6/1890 | Maschmeyer | 248/412 |
| 1,818,977 | 8/1931 | Gray | 248/412 X |
| 2,329,932 | 9/1943 | Nelson | 248/125 |
| 2,673,771 | 3/1954 | Krewson | 248/311.3 X |
| 2,935,286 | 5/1960 | Parsons | 248/311.3 X |
| 2,957,187 | 10/1960 | Raia | 248/311.3 X |
| 3,727,872 | 4/1973 | Spieth et al. | 248/412 |
| 3,797,792 | 3/1974 | Huber | 248/125 X |
| 3,807,574 | 4/1974 | Lanza | 248/125 X |

Primary Examiner—Lawrence J. Staab
Attorney, Agent, or Firm—Lothrop & West

[57] ABSTRACT

A horizontal trigger bar is centrally pivotally mounted on the top of a telescoping pole provided with conventional support bars from which an intravenous bottle is suspended. A clutch retains the pole at a length such that the bottle is at the desired height above a patient in a hospital bed. In the event the bed is raised and the trigger bar engages an overhead object, such as a light fixture, or a cubicle partition rail, the trigger bar will yield and assume either a lowered or a tilted attitude, thereby disengaging the clutch and allowing the pole to telescope downwardly to avoid damage to the equipment and possible harm to the patient.

7 Claims, 6 Drawing Figures

INTRAVENOUS POLE

BACKGROUND OF THE INVENTION

The intravenous administration of various types of fluids to patients in a hospital or the like, is a technique in widespread use. Ordinarily, a pole is inserted in a socket on the frame of the patient's bed, the upper end of the pole usually being provided with a hook from which the inverted bottle of IV fluid is suspended.

Should the intravenous pole, or IV pole, as it is commonly known, be located below a piece of equipment, such as a wall-hung lamp fixture, and should the bed be elevated, the IV pole will engage the fixture, frequently causing damage to the equipment and in some cases serious harm to the patient, should the bottle be dislodged from its support, for example.

IV poles of a telescoping nature are not unknown; however, so far as I am aware, such poles are extended to the required height and then locked in place, as by set-screws. In effect, such poles are no different from fixed ones and are capable of causing the same damage in the event the bed is elevated.

There is, in other words, considerable room for improvement.

SUMMARY OF THE INVENTION

The invention relates to improvements in IV poles and, more particularly, to an IV pole which yieldingly retracts as it engages an overhead object, thereby eliminating the risk of harm to a patient and damage to equipment in the event the patient's bed is raised.

It is an object of the invention to provide an improved IV pole which affords all the conveniences of a conventional IV pole while adding to the safety thereof.

It is another object of the invention to provide an IV pole which is sturdy, reliable, easy to operate and economical in cost.

It is still another object of the invention to provide a generally improved IV pole.

Other objects, together with the foregoing, are attained in the embodiment described in the following description and illustrated in the accompanying drawings.

BRIEF DESCRIPTION OF THE DRAWINGS

FIG. 5 is a median, longitudinal, vertical section, to an enlarged scale, of the clutch mechanism in engaged position;

FIG. 6 is a view comparable to FIG. 4, but with the clutch mechanism in disengaged position, allowing the IV pole yieldingly to telescope downwardly in the event of interference with superposed structures, as in FIGS. 3 and 4.

DETAILED DESCRIPTION OF PREFERRED EMBODIMENT

Figure 1:
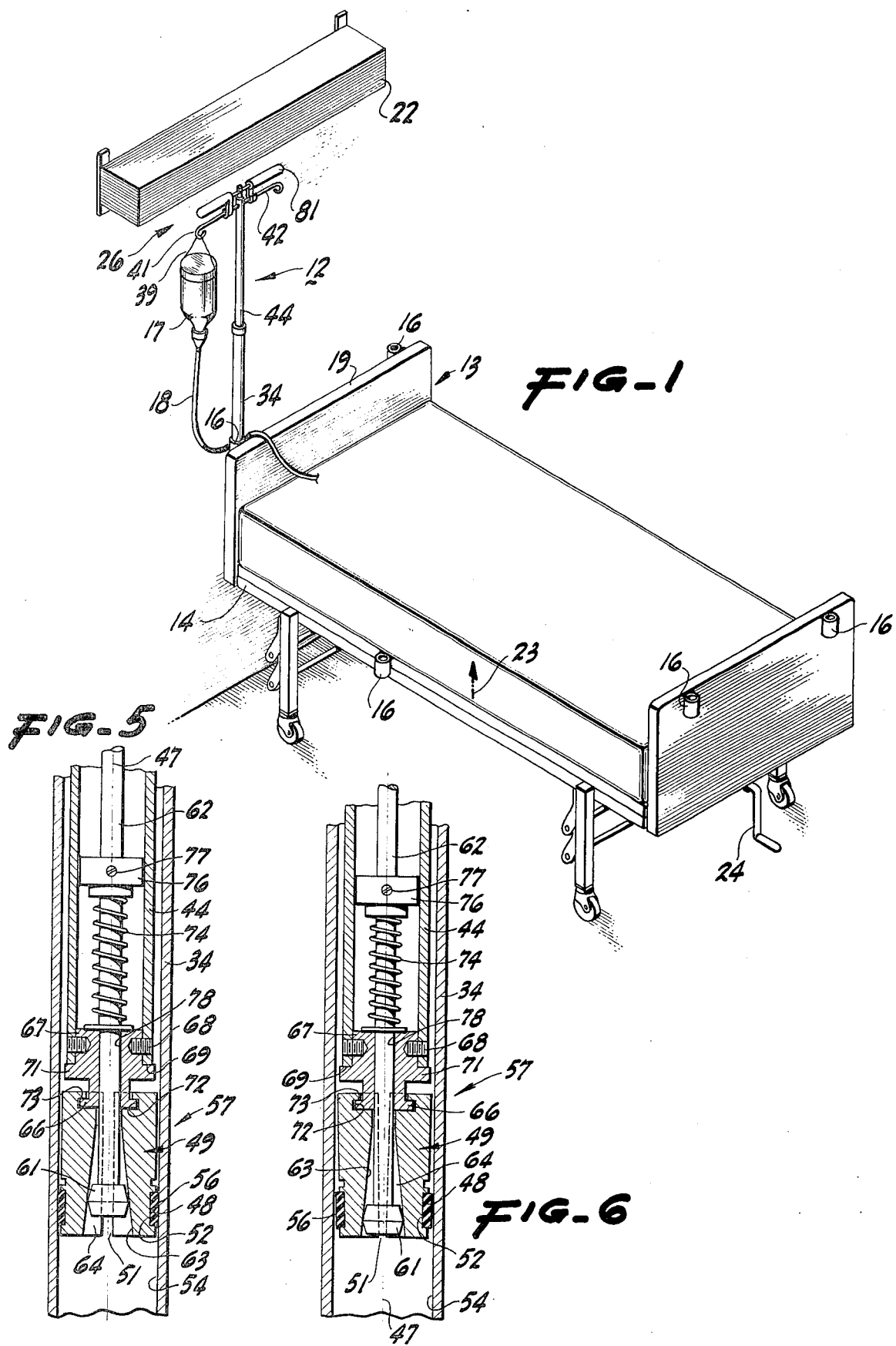
FIG. 1 is a fragmentary perspective view, to a reduced scale, showing a conventional hospital bed with an IV pole supported in a pole receptacle on the bed and located below a lamp fixture mounted on an adjacent wall.

While the improved IV pole of the invention is susceptible of numerous physical embodiments, depending upon the environments and requirements of use, the embodiment shown and described herein has been made, tested and used and has performed in an entirely satisfactory manner.

The IV pole of the invention, generally designated by the reference numeral 12, is customarily utilized in conjunction with a hospital bed 13. The bed frame 14 is provided with a plurality of conveniently located sockets 16, or receptacles, affording a choice of positions for the pole 12, the IV bottle 17 and accompanying tubing 18 while administering fluid intravenously to a patient (not shown) in the bed.

Frequently, the IV pole 12 is located at the head end 19 of the bed underneath a wall-hung light fixture 22.

On other occasions, the pole might be in position below a ceiling supported track (not shown) carrying a slidable partitioning member, such as a curtain, enabling the bed to be isolated in a cubicle arrangement.

In these and other similar situations where a piece of equipment is located above the IV pole, a risk of harm to the patient and damage to the equipment arises when the IV pole is elevated as by raising the bed 13 in the direction indicated in FIG. 1 by the arrow 23. Elevation is effected either by actuating a hand crank 24 or, electrically, by pressing a button on an electrical cord, not shown.

Raising of the bed sometimes occurs when a patient decides to elevate the bed or an attendant wishes to elevate the bed to Gurney height for patient transfer. Children, either as patients or as bored visitors, have also been known to actuate the bed lifting mechanism. In such cases the top of the IV pole will strike any superposed equipment, such as the light fixture 22. If impact occurs with sufficient force, severe damage to the fixture results and in some instances the IV bottle becomes dislodged with consequent harm to the patient.

In order to circumvent these undersirable consequences, I provide an arrangement whereby the IV pole telescopes downwardly at a rate substantially equal to the rate at which elevation of the bed occurs, telescoping taking place as soon as the trigger 26, or sensing portion, of the actuating mechanism 27 comes into contact with the overlying structure 22.

Figure 2:
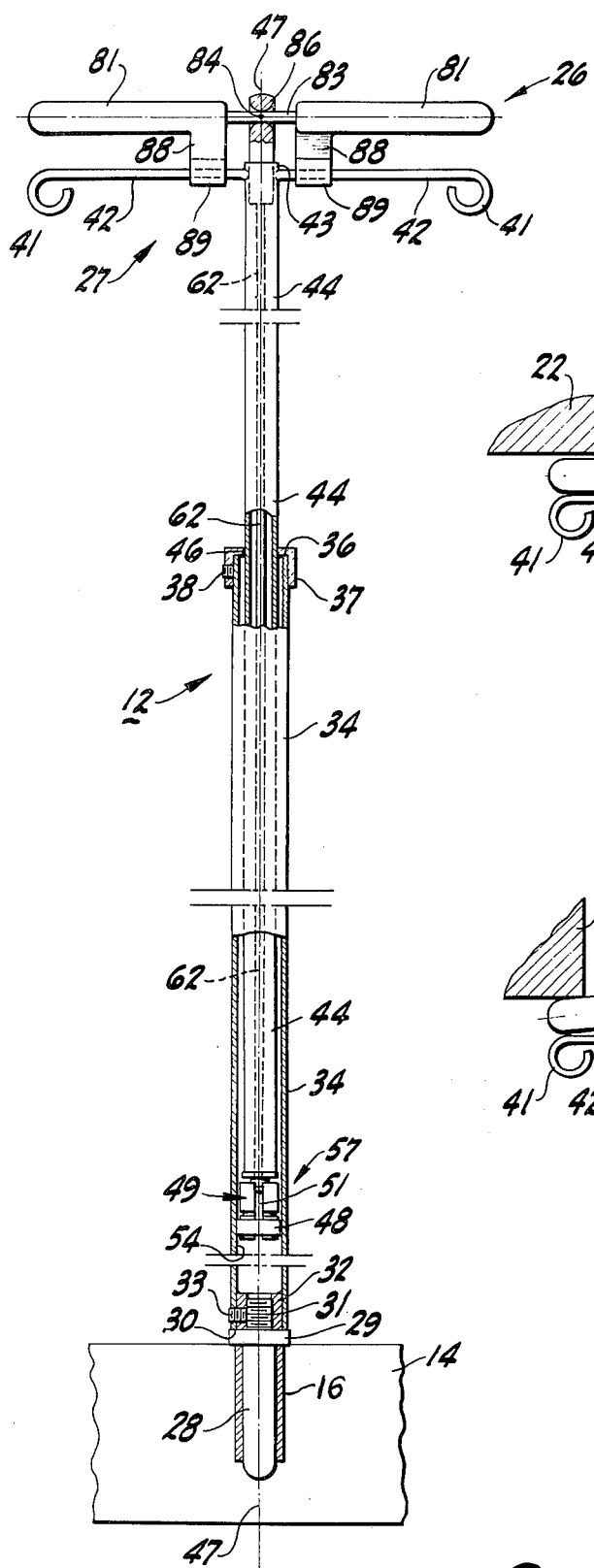
FIG. 2 is a front elevational view of a preferred embodiment of the invention located in customary position in a pole receptacle on a bed frame, portions being shown in section and other portions being broken away to reduce the extent of the figure.

As appears most clearly in FIGS. 1 and 2, the pipelike socket 16, or receptacle, is mounted vertically on the bed frame 14 and accommodates a socket pin 28 depending from an annular flange 29 supported on top of the socket 16.

Upstanding from the flange 29 is a threaded boss 31 enabling the socket pin 28 to be mounted on the bottom end 30 of the pole by means of an internally threaded sleeve 32 secured to the pole by set screws 33. The sizes of the receptacles 16 vary, depending upon the make of the hospital bed. Accordingly, by making the socket pin 28 of suitable different dimensions, the IV pole 12 can be made to a standard, or uniform, size, if desired, which will fit on any bed.

The IV pole includes an outer tube 34 extending upwardly from the bottom end 30 to a top end 36 (see FIG. 2) surmounted by a cap 37 secured to the top of the tube by a set screw 38.

The socket pin 28 fits snugly in the receptacle 16 and the connection between the threaded boss and the bottom of the tube 34 is secure. As a consequence, the IV pole is strong, rigid and reliable in supporting the IV bottle 17 with the bail 39 (see Fig. 1) located on either one of the downwardly and inwardly recurved hooks 41.

The hooks 41 are formed on the opposite outer ends of a pair of sturdy support bars 42 securely mounted on and extending horizontally in opposite directions from the upper end 43 of a hollow stem 44. The hollow stem 44 is disposed within the tube 34 is telescoping relation. A central opening 46 in the cap 37 receives the hollow stem 44 and acts as a centering bearing which helps to keep the hollow stem aligned with the vertical axis 47 of the tube 34.

Further assisting in maintaining the hollow stem 44 in vertical attitude is a resilient annular band 48, or ring, encompassing a split collar 49 divided into two equal halves by a pair of vertical slots 51.

The resilient ring 48 fits snugly within a conjugate annular recess 52 around the exterior of the collar 49 adjacent the lower end of the collar, as appears most clearly in FIGS. 5 and 6.

The annular recess 52 has a depth such as to receive about one-half the thickness of the resilient ring 48, the outer one-half of the ring being exposed to the encompassing wall 54 of the tube 34.

The resilient ring 48 seves not only as a centering device for the hollow stem 44, however. Theexterior surface 56 of the ring also serves as a friction member of a clutch mechanism 57 on the lower end of the hollow stem 44.

The clutch mechanism 57 in engaged position, as will now be described, enables the telescoping stem 44 to be located at any extended position relative to the tube 34 so that the hook 41 will support the intravenous bottle 17 at the desired height above the patient.

Engagement between the outer, friction surface 56 of the ring 48 and the tube wall 54 is effected by an enlarged camming head 61 mounted on the lower end of an operating rod 62, the camming head 61 exerting radially outward force on the adjacent sloping walls 63 of a downwardly diverging conical chamber 64 within which the camming head 61 is located.

As is shown most clearly in FIGS. 5 and 6, the two halves of the split collar 49 pivot about an annular flange 66 depending from a fitting 67 secured by a pair of set screws 68 to the bottom end 69 of the hollow stem 44, the fitting 67 also providing an annular shoulder 71 against which the bottom end of the hollow stem 44 abuts.

As previously indicated, the two halves of the split collar 49 pivot about the annular flange 66. More particularly, the upper portion of the collar halves is provided with an annular recess 72 which loosely encompasses the annular flange 66 at the bottom end of the fitting 67.

The recesses 72 delineate a split annular flange 73 on the upper end of the split collar halves, the flanges 73 being supported on the bottom flange 66 of the fitting 67.

With the operating rod 62 and camming head 61 in upper position, as appears in FIG. 5, the lower end portions of the split collar 49 are wedged apart by the force exerted by a compression spring 74 acting to lift the camming head 61 against the tapered walls 63 of the conical chamber 64. The lower ends of the two halves of the split collar are forced outwardly, pivoting about the loose engagement between the interfitting flange 66, recess 72 and flange 73.

The outward wedging action of the split collar is opposed by the resilient compressive force of the ring 48. However, the spring constant of the compression spring 74 is selected so as to overcome the force exerted by the resilient ring 48, although but by a relatively small amount.

The compression sring 74 abuts, at its lower end, against the top of the fitting 67 secured to the lower end 69 of the hollow stem 44. The upper end of the compression spring 74, on the other hand presses upwardly on a collar 76 affixed to the operating rod 62 by an opposed pair of set screws 77, only one of which set screws is shown in FIGS. 5 and 6.

The operating rod 62, in other words, is vertically relatively movable with respect to the fitting 67 and, thus can translate relative to the hollow stem 44. It is to be noted, in this connection, that the operating rod 62 is slidably disposed within an axial bore in the fitting 67, the bore walls serving as a bearing for the lower end of the operating rod.

The relative vertical movement between the operating rod 62 and the hollow stem 44 provides selective engagement and disengagement of the clutch mechanism 57. In turn, selective engagement and disengagement of the clutch mechanism 57 allows selective, relative movement and positioning of the hollow stem 44 with respect to the tube 34, thereby affording telescoping capabilities to the IV pole In order to disengage the clutch mechanism 57 from the engaged mode shown in FIG. 5, it is only necessary to lower the camming head 61 to the location shown in FIG. 6, a relatively short distance. With the camming head 61 located in the lower enlarged portion of the conical chamber 64, as appears in FIG. 6, the restoring force of the resilient ring 48 squeezes inwardly on the lower ends of the split collar halves until the outer periphery 56 of the friction ring 48 is clear of the surrounding walls 54 of the tube 34, allowing relative, telescoping motion to take place between the hollow stem 44 and the tube 34.

Figure 3:
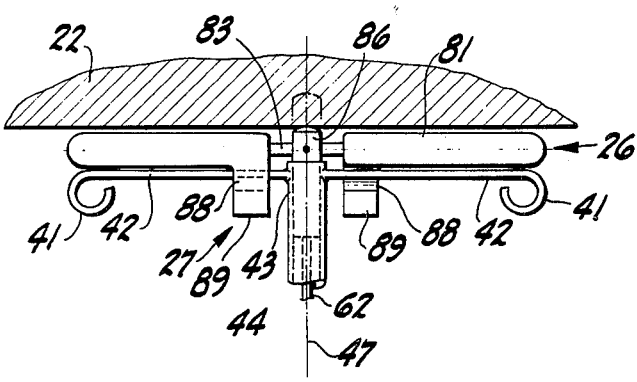
FIG. 3 is a fragmentary view showing the upper end of the IV pole of FIG. 2, but illustrating the position of the trigger bars when lowered into clutch disengaging location by engagement of both bars with a superposed structure such as a lamp fixture.

In order to lower the operating rod 62, and thus disengage the clutch 57, the hospital attendant need merely grasp one or the other of the support bars 42 with one hand, or both bars with both hands, if preferred. Simultaneously, the palm of the hand with the fingers curled underneath the respective support bar 42 is placed on top of a trigger bar 81 above the support bar. The palm and the fingers are then squeezed toward each other.

Where both hands are used, both trigger bars 81 are urged toward both of the respective support bars 42, as in FIG. 3.

Where only one hand is used, only one of the trigger bars 81 is moved toward the subjacent support bar 42.

In either case, the operating rod 62 is urged downwardly, against the upward bias of the compression spring 74, and the camming head 61 is lowered so that disengagement occurs between the friction ring 48 and the encompassing walls 54 of the tube 34, as previously described.

Figure 4:
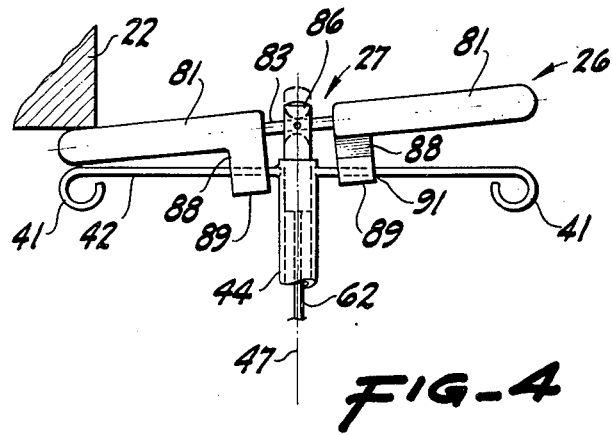
FIG. 4 is a fragmentary view showing the upper end of the IV pole of FIG. 2, but with the trigger bars in tilted attitude as a result of engagement of one trigger bar only with an interfering structure.

The construction and operation of the trigger mechanism 26 and rod actuating mechanism 27 appear most clearly in FIGS 2-4.

The trigger bars 81 are the outer extensions of a pivot bar 83 pivotally mounted on a transverse pin 84 located adjacent the upper end of a plunger 86 slidably disposed within the upper end portion of the hollow stem 44 and attached to the upper end of the operating rod 62. Preferably, the trigger bar is coated with a thick layer of "plastic" material molded on the pivot bar 83.

As best appears in FIG. 2, the portions of the plunger 86 on opposite sides of the pivot pin 84 are hollowed out and rounded as shown so that the pivot bar 83 can freely pivot through several degrees in either an upward or a downward direction relative to the fixed vertical attitude of the plunger 86 and the operating rod 62.

Thus, even though only one of the trigger bars 81 is depressed, as in FIG. 4, rather than both of the trigger bars, as in FIG. 3, the plunger 86 and the oerating rod 62 are lowered, thereby disengaging the clutch 57 in the manner previously described.

Pivoting, or tilting, of the trigger bars 81 is facilitated by the addition of a pair of depending straps 88 upturned at their lower ends to form a pair of loosely fitting U-shaped clips 89 enclosing the subjacent one of the support bars when the plunger 86 and the operating rod 62 are in uppermost position as appears in FIGS. 1 and 2.

It is also to be noted that the clips 89 are recurved in opposite directions, with the openings on the opposite sides of the straps, to facilitate assembly.

When both trigger bars 81 are simultaneously depressed, either by (a) the squeezing force exerted by the attendant's two hands in order to disengage the clutch and permit adjustment of the IV pole length, as desired, or (b) abutment of the trigger mechanism 26 and the actuating mechanism 27 with an overlying object, such as the light fixture 22, when the bed is inadvertently elevated with the IV pole below the fixture, both of the oppositely facing, loosely fitting U-shaped clips 89 descend below their respective support bars, as shown in FIG. 3.

When, however, only one of the trigger bars 81 is depressed, either by (a) squeezing the trigger with one hand only, or (b) abutment of only one of the trigger bars with an object 22, as in FIG. 4, only the adjacent one of the clips 89 is depressed and becomes disengaged from the respective support bar. The nether one of the clips 89, on the other hand, remains in engagement with its respective support bar 42 and, although tilting somewhat, as shown in FIG. 4, provides a pivot point 91 and a limit stop so that the plunger 86 is lowered from the position shown in broken line in FIG. 4 to the position shown in full line.

The compression spring 74 affords a constant upward urgency on the operating rod 62 and on the plunger 86. Thus, upon release of the attendant's hand pressure, after the IV pole has been extended to the length desired, the trigger bars 81 are again deactivated by elevating them to the full extent permitted by the clips 89. Simultaneously, the upward urgency of the operating rod 62 forces the camming head 61 upwardly and wedges apart the split collar, overcoming the resilient urgency of the friction band 48 and causing the band to re-engage the surrounding tube walls, thereby re-engaging the clutch and holding the IV pole at the desired location in opposition to the force of gravity.

The constant upward urgency of the compression spring 74 also assures that if and when a bed is elevated so that the IV pole is moved upwardly into engagement with an overlying object 22, as in FIGS. 1, 3 and 4, the clutch mechanism yields automatically, but either in a clutch slipping manner or in such small increments that the IV pole telescopes or retracts downwardly at the same rate that the bed is raised. There is, in other words, no disengagement of the clutch as would permit gravity to take charge and allow the pole to telescope downwardly its full length almost instantaneously, with consequent impact and possible harm to patient and equipment alike.

It can therefore be seen that I have provided an IV pole which can readily and securely be extended to the desired length, and which reliably and automatically permits the pole to shorten in the event it is inadvertently brought into engagement with an interfering object.

What is claimed is:

1. An intravenous pole comprising:
   a. a tube extending from a lower end to an upper end;
   b. a hollow stem partially disposed within said tube in telescoping relation thereto, said hollow stem having a bottom end inside said tube and a top located above said upper end of said tube;
   c. a pair of oppositely extending horizontal support bars mounted on said top end of said hollow stem said support bars including means for supporting an intravenous bottle;
   d. clutch means on said bottom end of said hollow stem for selectively engaging and disengaging the encompassing inside walls of said tube in order respectively to immobilize said hollow stem and to release said hollow stem;
   e. an operating rod disposed within said hollow stem in telescoping relation thereto, said rod extending upwardly from a lower end in operating relation with respect to said clutch means to an upper end located above said top end of said hollow stem, said rod being movable between a first upper position in which said lower end of said rod actuates said clutch means and a second lower position in which said rod releases said clutch means;
   f. trigger means mounted on said upper end of said operating rod for urging said rod from said first position toward said second position, said trigger means including a crossbar centrally pivoted on said operating rod above said support bars and providing a pair of oppositely extending handles substantially parallel to said support bars when said rod is in said first upper position, and a pair of straps each depending from one of said handles into engagement with a respective one of said support bars, said support bars and said straps affording a stop limiting the upward movement of said rod; and,
   g. spring means for urging said rod from said second position toward said first position, said spring means being effective to elevate said rod against the force of gravity but ineffective to resist a predetermined downward force.

2. An intravenous pole as in claim 1 in which each of said straps loosely encompasses a portion only of the respective one of said support bars so that when either of said handles is depressed the respective one of said straps is free to disengage the respective one of said support bars and when both of said handles are depressed both of said straps are free to disengage said support bars.

3. An intravenous pole as in claim 2 in which one of said straps provides a pivoted engagement with the adjacent one of said support bars when the other one of said straps is disengaged from the respective support bar by depression of the respective handle.

4. An intravenous pole comprising:
 a. a vertical tube having circular in section interior walls;
 b. a hollow vertically adjustable stem having a lower portion telescopingly received in said tube and an upper portion extending above said tube;
 c. means on said upper portion of said stem for supporting an intravenous bottle;
 d. clutch means carried on said lower portion of said stem capable of selectively engaging and disengaging said interior walls of said tube to position said stem vertically relative to said tube;
 said clutch means including a vertically oriented split collar having its upper portion pivotally mounted on said stem to enable the separated lower end portions of said split collar to move toward and away from said interior walls of said tube, said clutch means further including a resilient annular band encompassing said separated lower end portions of said split collar and being effective to bias said split collar radially inwardly with a predetermined force from a first expanded position in which said band is in frictional clutching engagement with said interior walls of said tube toward a second contracted position in which said band is disengaged from said interior walls of said tube;
 e. an operating rod vertically disposed within said hollow stem in telescoping relation thereto, said operating rod extending downwardly from an upper end located above said upper portion of said stem to a lower end located between said separated lower end portions of said split collar, said lower end of said operating rod being engageable with said split collar and effective further to separate said lower end portions of said split collar and to expand said resilient annular band from said contracted second position toward said expanded first position as said rod is moved upwardly to exert on said lower end portions of said split collar an outward force exceeding said predetermined inward force exerted by said band;
 f. spring means for urging said rod upwardly with a force capable of exerting said excessive outward force on said lower end portions of said split collar; and,
 g. trigger means mounted on said upper end of said operating rod for urging said rod downwardly with a force greater than said upward force of said spring means to enable said resilient annular band to move from said expanded first position to said contracted second position out of engagement with said encompassing interior walls of said tube.

5. An intravenous pole as in claim 4 in which said lower end of said operating rod includes a camming head, and in which said lower end portions of said split collar define an interior chamber with downwardly diverging walls, said camming head being in engagement with said walls providing outward force on said lower end portions of said split collar as said operating rod is urged upwardly, the outward force exerted by said camming rod on said downwardly diverging walls being diminished as said operating rod is urged downwardly by said trigger means.

6. An intravenous pole as in claim 5 in which said trigger means includes a crossbar centrally pivoted on said operating rod about said intravenous bottle support means, downward urgency of said crossbar by a force exceeding said upward force of said spring means being effective to lower said operating rod and said camming head relative to said split collar and allow disengagement of said resilient annular band from said interior walls of said tube, thereby permitting said hollow stem to descend through said tube until the downward force on said crossbar no longer exceeds said upward force of said spring means.

7. An intravenous pole as in claim 6 in which said spring means includes a fitting mounted on said lower portion of said hollow stem, said fitting including an annular shoulder around said operating rod; a collar mounted on said operating rod above said shoulder; and a helical compression spring interposed between said annular shoulder and said collar tending to urge said operating rod in an upward direction.

* * * * *

UNITED STATES PATENT AND TRADEMARK OFFICE
CERTIFICATE OF CORRECTION

PATENT NO. : 4,113,222
DATED : September 12, 1978
INVENTOR(S) : Jerry C. Frinzell It is certified that error appears in the above-identified patent and that said Letters Patent are hereby corrected as shown below:

INVENTOR: JERRY C. FRINZELL

Signed and Sealed this

Twentieth Day of March 1979

[SEAL]

*Attest:*

RUTH C. MASON
*Attesting Officer*

DONALD W. BANNER
*Commissioner of Patents and Trademarks*